United States Patent
Lueck

(10) Patent No.: US 7,562,491 B1
(45) Date of Patent: Jul. 21, 2009

(54) DOCK MOUNTED FISH LIVE BOX

(76) Inventor: Douglas A. Lueck, 433 Casper Cir., Norwood, MN (US) 55368

( * ) Notice: Subject to any disclaimer, the term of this patent is extended or adjusted under 35 U.S.C. 154(b) by 4 days.

(21) Appl. No.: 11/455,543

(22) Filed: Jun. 19, 2006

Related U.S. Application Data

(60) Provisional application No. 60/595,293, filed on Jun. 21, 2005.

(51) Int. Cl.
*A01K 97/04* (2006.01)
(52) U.S. Cl. .......................................................... 43/55
(58) Field of Classification Search .................. 43/55, 43/54.1, 56
See application file for complete search history.

(56) References Cited

U.S. PATENT DOCUMENTS

| | | | |
|---|---|---|---|
| 268,558 A * | 12/1882 | Small .......................... 43/55 |
| 980,148 A * | 12/1910 | Garrard ........................ 43/55 |
| 2,149,482 A * | 3/1939 | Whitaker ...................... 43/55 |
| 2,169,941 A * | 8/1939 | Campbell .................... 114/343 |
| 2,530,148 A * | 11/1950 | Bjorklund et al. ........... 119/474 |
| 2,715,293 A * | 8/1955 | Martin .......................... 43/55 |
| 2,945,658 A * | 7/1960 | Hayslip ................... 248/125.1 |
| 4,429,659 A | 2/1984 | Holyoak |
| 6,234,444 B1 * | 5/2001 | Haddad ...................... 248/545 |
| 6,267,079 B1 | 7/2001 | Eby |
| D451,675 S | 12/2001 | Hardy et al. |
| D462,737 S | 9/2002 | Lipari |
| D485,329 S | 1/2004 | Haws |
| D499,164 S | 11/2004 | Lillard et al. |

* cited by examiner

*Primary Examiner*—Kurt Rowan
(74) *Attorney, Agent, or Firm*—Richard John Bartz

(57) ABSTRACT

A fish live box has a frame assembly supporting a mesh screen surrounding a chamber for accommodating fish. A top wall and door closes the top of the frame assembly. Brackets mount the live box to a dock. Upright legs mounted on the frame assembly are vertically adjustable to locate pads on the bottom of the legs on the bed of a body of water to support the box on the bottom of a body of water.

6 Claims, 5 Drawing Sheets

DOCK MOUNTED FISH LIVE BOX

CROSS REFERENCE TO RELATED APPLICATION

This application claims the priority benefit of U.S. Provisional Application Ser. No. 60/595,293 filed Jun. 21, 2005.

FIELD OF THE INVENTION

The invention relates to aquatic vertebrate and living matter holding structures. The holding structure comprise boxes connected to dock for holding live fish in a body of water.

BACKGROUND OF THE INVENTION

Floating fish baskets and live wells are used for fish caught alive for an extended period of time. Floating fish baskets have buoyant rings attached to nets to form holding areas for fish. Tether lines are used to secure the basket to a boat or dock. Examples of a floating fish baskets are disclosed in U.S. Pat. Nos. 3,478,463; 3,919,803; D462,737; and D485,329. These fish baskets are portable structures that float on the surface of a body of water. Base boats have live wells included in the structure of the boats supplied with aeration systems. Fish die quickly in these live wells because the aeration systems pull in warm surface water. A live well for accommodating fish having a portable container mounted in a boat is disclosed in U.S. Pat. No. 6,105,305. The container is a flexible bag with a well cavity for holding water. A plurality of cords attached to hooks releaseably attach the bag to opposite gunwales of the boat. The fish live box of the invention bring a stationary live well mounted on a dock and supported on the bed of a body of water used to maintain fish for an extended period of time avoids the disadvantages of the prior fish baskets and fish live wells.

SUMMARY OF THE INVENTION

The invention comprises a fish live box mountable on a dock and supported with legs on the bottom of a body of water adjacent the dock. The fish retained in the water in the box are kept alive and healthy in a natural environment. The live box has a frame assembly having interconnected tubes providing support for a mesh screen. The screen surrounds the sides, ends and bottom of the frame assembly and defines a chamber accommodating water when placed in a body of water. Fasteners, such as loop ties, attach the mesh screen to the frame assembly. The top of the frame assembly supports a top wall connected to a door with a hinge allowing the door to be moved to open and closed positions relative to the open top of the frame assembly. The outer side of the frame assembly is supported and stabilized on the bed of the body of water with upright legs attached with clamps to the frame assembly. The clamps have adjustable fasteners that allow the legs to be adjusted up and down to accommodate the depth of the water adjacent to the dock. Pads on the lower ends of the legs rest on the bed of the body of water to support the box on the bed. Tube extensions coupled to the legs are used to compensate for water depth. The invention includes the combination of a dock extended over a body of water, such as a lake, pond, or river, and a box located in the body of water for holding live fish. The box has an internal chamber accommodating water and fish. Brackets connect the inside of the box to the desk. At least one upright leg connected to the outside of the box supports the box on the bed of the body of water. The leg has a lower end extended downward into the water and engageable with the bed of the body of water to support and stabilize the box on the bed. The preferred embodiment of the box holding the apparatus has two brackets connected to the box and two legs connected with adjustable clamps to the box. Generally flat pads secured to the lower ends of the legs rest on the bed to provide a firm support for the box on the bed. Extensions can be added to the legs to accommodate water depth. The fish live box is made of rust proof plastic parts and is sturdy in construction and easy to install with common hand tools. The fish live box fits most docks. Environmentally the fish live box allows fish to remain in the water of the body of water keeping the fish in a natural and deeper setting. There is a less stressful fish environment allowing easy release or cleaning for food.

DESCRIPTION OF THE INVENTION

Figure 1:
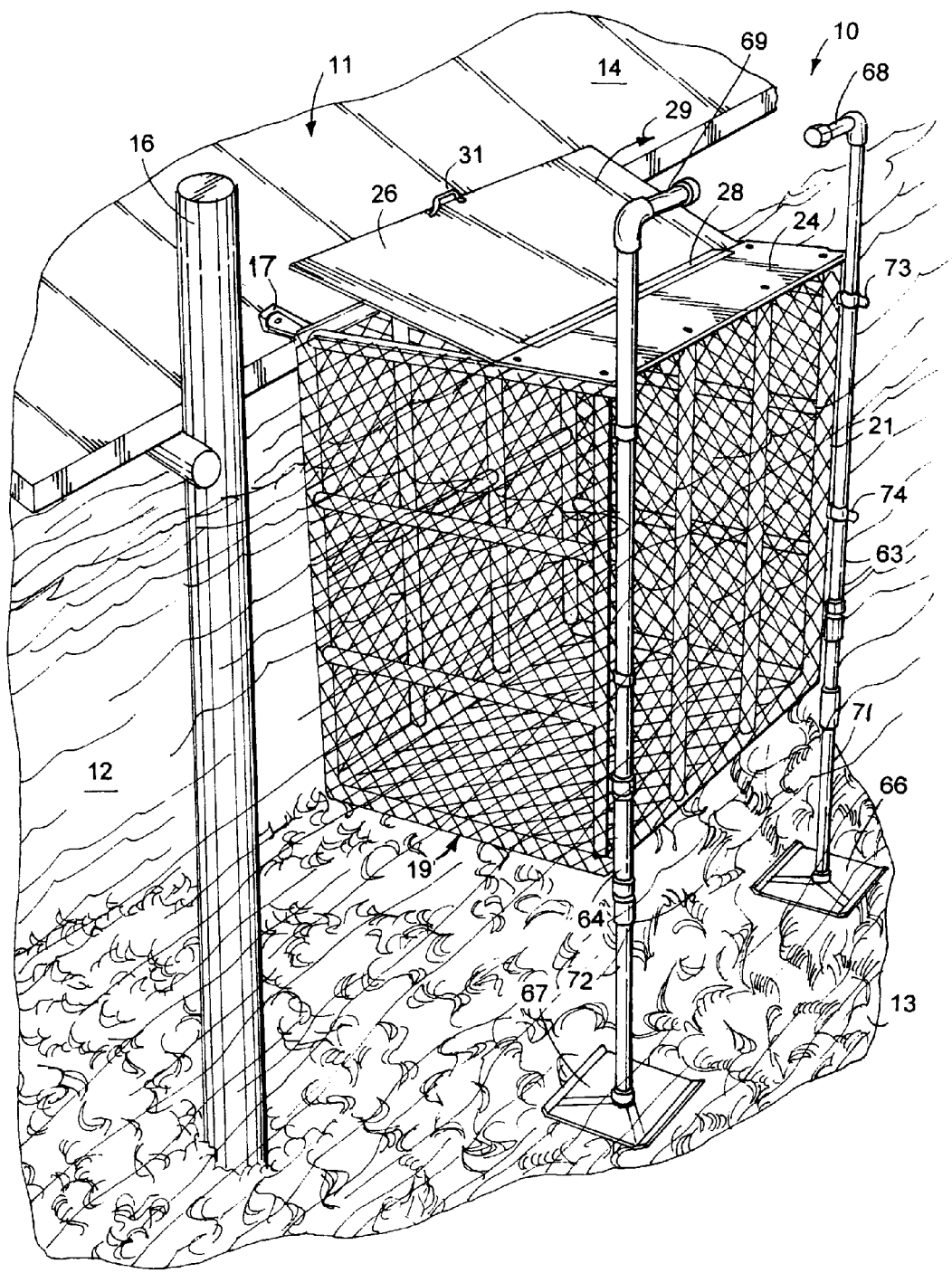
FIG. 1 is a perspective view of the dock mounted fish live box of the invention mounted on a dock extended over a body of water.

A fish live box 10 of the invention mounted on the side of a dock 11, shown in FIG. 1, extends downward into a body of water 12, such as a lake, pond or river, to retain fish in the water. Dock 11 is a conventional structure having a horizontal deck 14 extended over the surface of water 12 and anchored to the bottom or bed 13 of the body of water with upright posts 16. Other devices such as floats, can be used to support deck 14 on water 12. A pair of brackets 17 and 18 connect fish live box 10 to a side of deck 14. Fish live box 10 can be removed from brackets 17 and 18 to allow box 10 to be raised out of the water and placed in a storage location. Box 10 is not broken down or taken apart when it is removed from dock 11.

Figure 6:
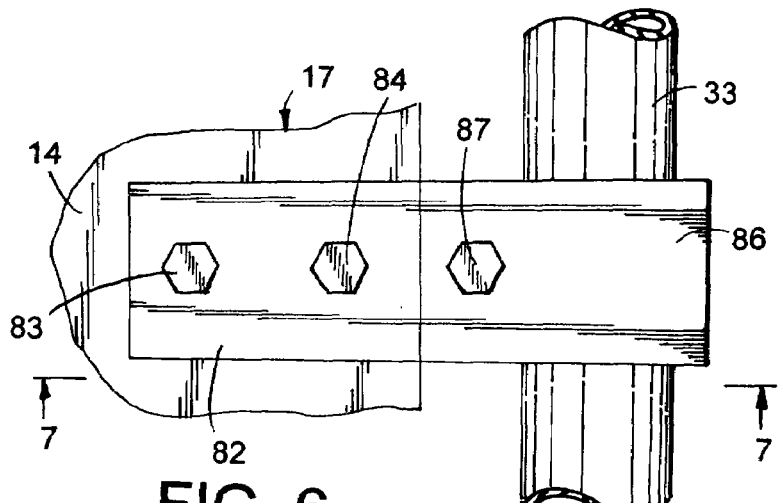
FIG. 6 is an enlarged top plain view of the bracket connecting the frame assembly of the fish kennel to the dock.
Figure 7:
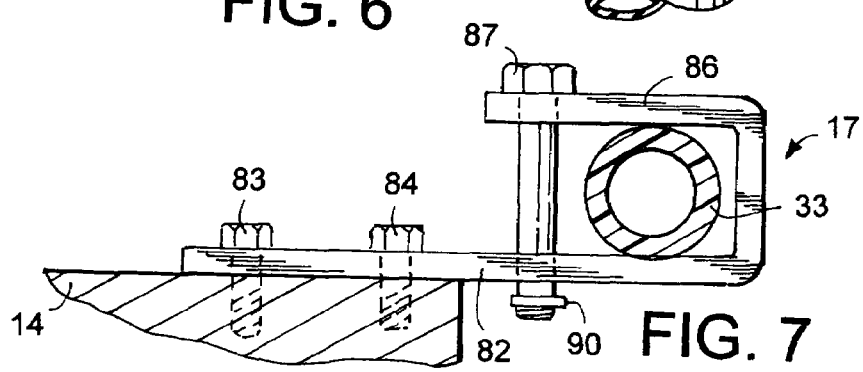
FIG. 7 is a sectional view taken along the line 7-7 of FIG. 6.

Bracket 17, shown in FIGS. 6 and 7, is a hook shaped member having a flat base 82 secured with fasteners 83 and 84 to deck 14, A lip 86 joined to base 82 extends around a top frame member 33 of box 10. A removable pin 87 extends through a hole in base 82 lip 86 to hold frame member 33 in engagement with bracket 17. A spring key 90 located in the lower end of pin 87 retains pin 87 in a locked position on bracket 17. Key 90 can be removed from pin 87. Pin 87 can then be removed from base 82 and lip 86 to allow frame member 33 to be disconnected from bracket 17. Bracket 18 has the same structure as bracket 17.

The following description of live box 10 is directed to holding live fish and aquatic vertebrates. Live box 10 can be used to hold other aquatic organisms and plants. Box 10 is an aquatic cage to contain fish, water creatures, plants for research, breeding and raising and keeping fish for food.

Fish live box 10 has a frame assembly 19 supporting an open mesh screen 21 surrounding an internal chamber 22. Screen 21 is attached with plastic loop fasteners or ties 23 to the sides and bottom of frame assembly 19. The open top of frame assembly 19 is closed with a top wall 14 and lid or door 26. A transverse hinge 28 pivotally connects door 26 to top wall 24 to allow door 26 to swing, as shown by arrow 29, to open and closed positions. A handle 31 attached to an outer edge portion of door 26 is located adjacent deck 14 so that the angler can have easy access to live box 10. Top wall 24 and door 26 are rust-proof plastic sheets that are environmentally compatible with water and sunlight. Top wall 24 and door 26 are solid panels that shade the water in box 10; other materials, such as stainless steel, wood, and ceramics, can be used for top wall 24 and door 26.

Figure 5:
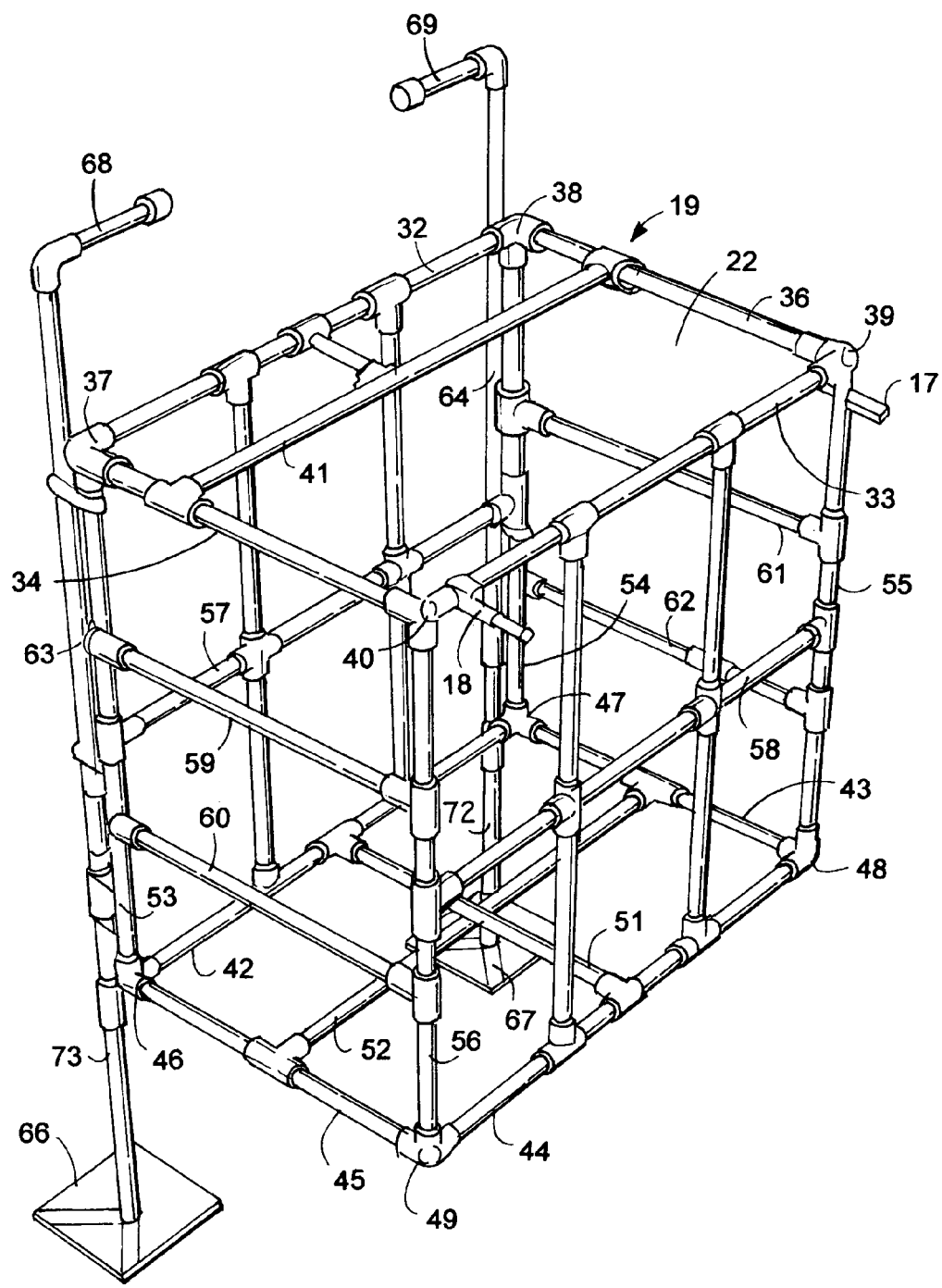
FIG. 5 is a perspective view of the frame assembly of the fish kennel of FIG. 1.

As shown in FIG. 5, frame assembly 19 has top longitudinal frame members 32 and 33 connected to transverse or side frame members 34 and 36 with corner connectors 37, 38, 39, and 40. A longitudinal member 41 extended between and joined to members 34 and 36 provides support for top wall 24 and hinges 28. Bottom frame members 42, 43, 44, and 45 are connected to corner connectors 46, 47, 48, and 49 and cross members 51 and 52. Upright frame members. The corners of members 53, 54, 55 and 56 to the corners of bottom frame members 42-45 upright corner members 53-56 are joined to corner connectors 46-49 to provide a rigid box frame assembly. Horizontal front and back members 57 and 58 extend between and are jointed to middle portions of upright corner members 53, 54, 55, and 56. End horizontal members 59, 60, 61, and 62 extend between and are jointed to corner members 53, 56 and 54, 55. The frame members are PVC tubes connected to PVC connectors to provide a rigid box frame assembly with a rectangular top opening. The connectors are conventional T, crossed and corner plastic tube components. The bottom corner connectors 46-49 have holes (not shown) that allow water into the tubular frame members or PVC tubes. The top corner connectors 37-40 have holes (not shown) to allow air to vent from the tubular frame members or PVC tubes to avoid flotation of frame assembly 19.

Figure 2:
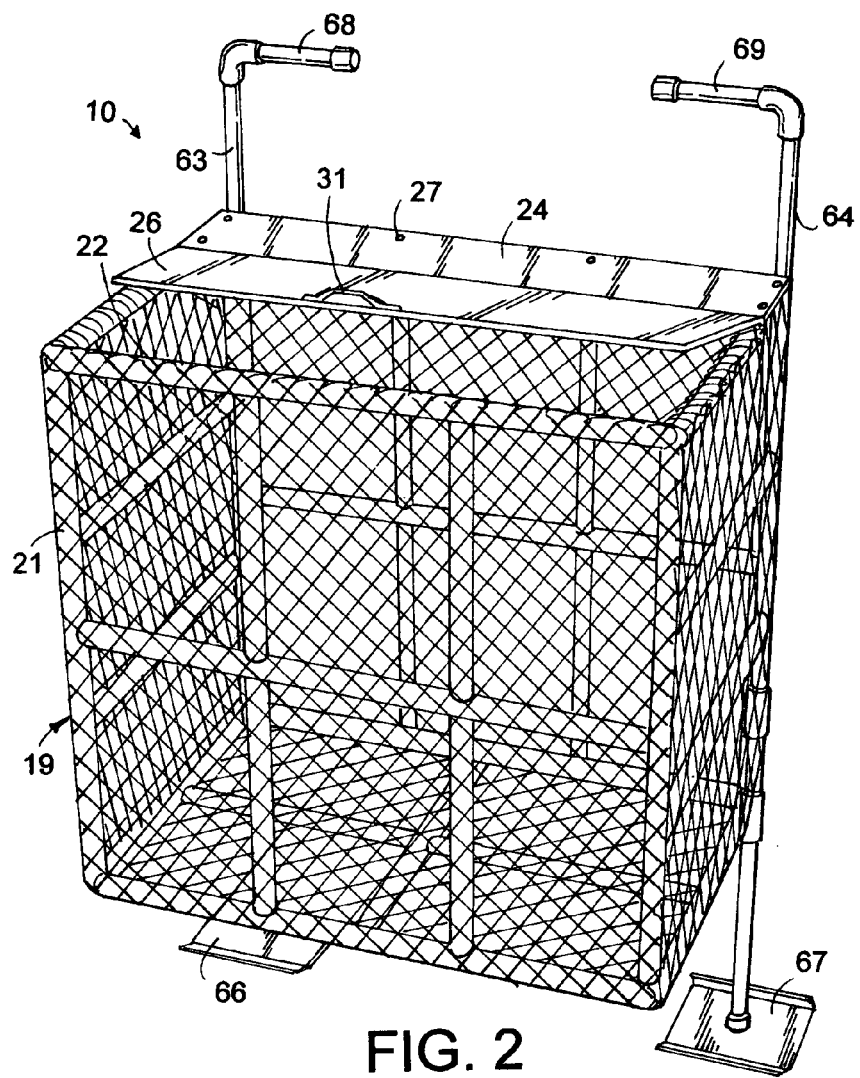
FIG. 2 is a front perspective view of the fish live box of FIG. 1.
Figure 3:
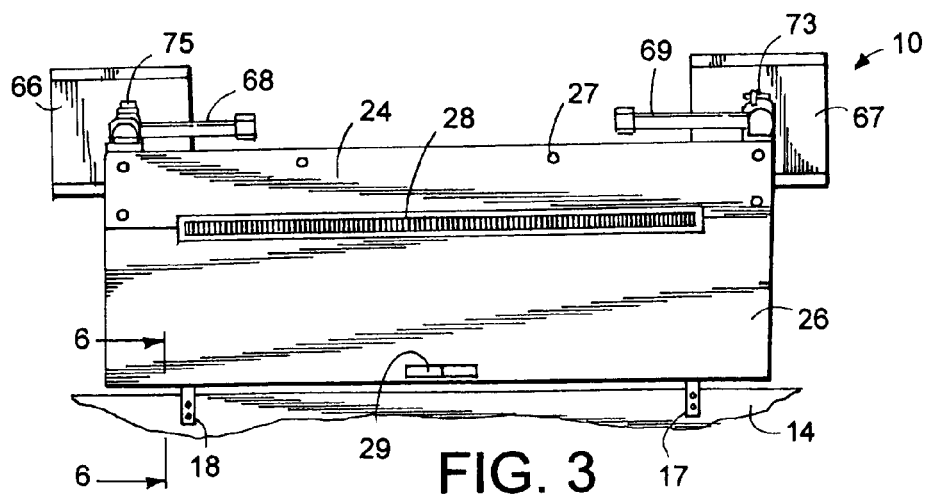
FIG. 3 is a top plain view thereof.
Figure 4:
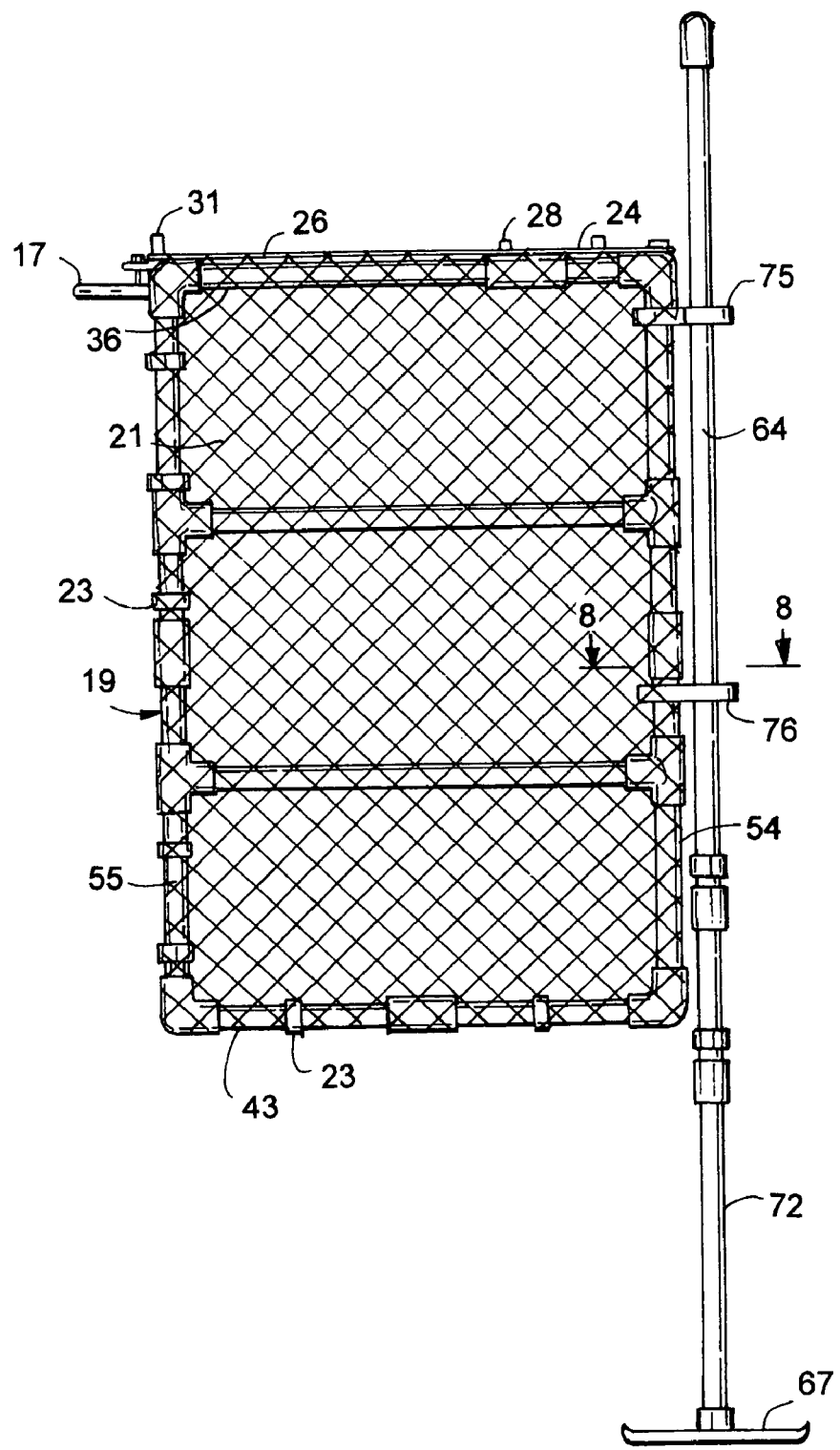
FIG. 4 is an enlarged side elevational view thereof.

As shown in FIGS. 1, 2, and 4, screen 21 extends around frame assembly 19. Loop fasteners or ties 23 secure screen 21 to all of the frame members. Screen 21 is a plastic mesh sheet member. An example of screen 21 is a ¾ inch mesh plastic screen. Other types of screens, such as nylon and wire screens and mesh sizes, can be used to enclose frame assembly 19.

Figure 8:
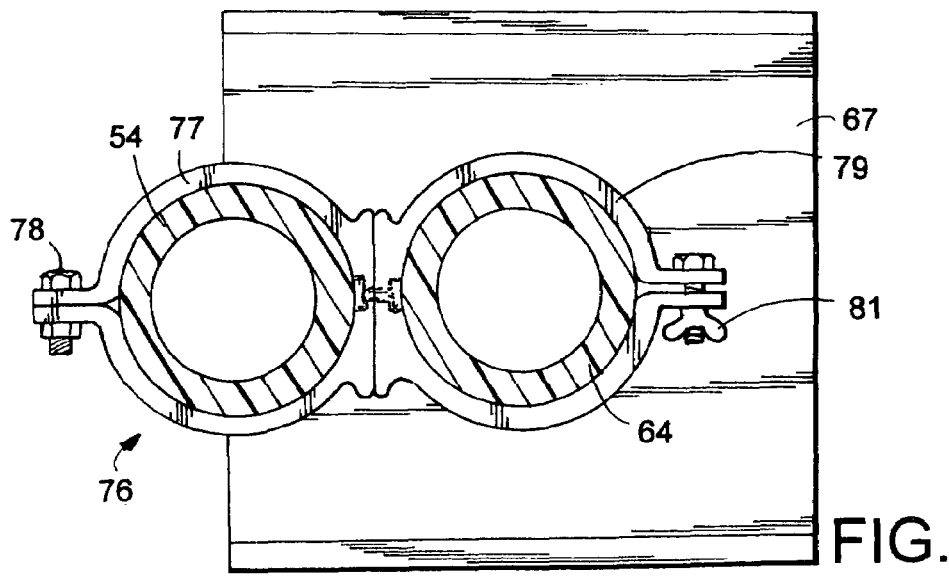
FIG. 8 is an enlarged sectional view taken along the line 8-8 of FIG. 4.

A pair of upright bars or legs 63 and 64 mounted on upright corner members 53 and 54 extend downward to bed 13 to support and stabilize the outside of frame assembly on bad 13. The bottom ends of legs 63 and 64 are connected to flat pads or feet 66 and 67. Which rest on bed 13. An example of a pad is a 10 inch square plastic plate having a upright center sleeve attached to the bottom of a leg. The large bottom surface areas of pads 66 and 67 limit the sinking of legs 63 and 64 into the soil of bed 13 as shown in FIG. 1. The upper ends of legs 63 and 64 have inwardly directed arms 68 and 69 providing stop for door 26 and hand grips or handles for placing box 10 in the water adjacent dock 11, connecting frame assembly 19 to dock mounted brackets 17 and 18 and removing box 10 from the water and brackets 17 and 18. As shown in FIGS. 1, 4, and 5, legs 63 and 64 have lower extensions 71 and 72 to compensate for the depth of the water 12 adjacent dock 11 so that pads 66 and 67 are located in firm engagement with bed 13. Additional extensions or longer extensions for deep water applications can be joined to legs 63 and 64 to accommodate water depth adjacent dock 11. Legs 63 and 64 are connected to upright corner members 53 and 54 with clamps 73, 74, 75, and 76 which allow legs 63 and 64 to be vertically adjusted to ensure that pads 66 and 67 are supported on bed 13. Clamps 75-76 are identical connecting devices that allow legs 63 and 64 to be vertically adjusted relative to frame assembly 19. As shown in FIG. 8, clamp 76 has a first cylindrical portion or split ring 77 located around leg 54 and clamped thereon with a nail and bolt assembly 78. A second cylindrical portion or split ring 79 joined to the first cylindrical portion 77 surrounds leg 64 and clamped thereon with a bolt and wing nut assembly 81. Wing nut can be manually turned to release the clamping force of cylindrical portion 79 on leg 64 to allow leg 64 to be adjusted up or down to level box 10 adjacent the side of dock 11 and engage pad 67 with bed 13 of the lake.

The fish live box has been described with reference to a preferred embodiment. Changes in the shape, materials and arrangement of parts can be made by persons skilled in the art without departing from the invention.

What is claimed is:

1. A box for holding live fish adapted to be attached to a dock extended over a body of water comprising: a frame assembly having a first side, a second side opposite the first side, end and bottom frame members, a mesh screen located adjacent the first and second sides, end and bottom frame members surrounding a chamber for water accommodating fish, fasteners connecting the screen to the first and second sides, end, and bottom frame members, a top wall mounted on the first and second sides, and end frame members, a door, a hinge pivotally connecting the door to the top wall whereby the door can swing between open and closed positions relative to the frame assembly and chamber, brackets connected to the first side frame member attachable to the dock for securing the frame assembly to the dock, each of the brackets has a base accommodating fasteners adapted to mount the base on the dock, a lip joined to the base extended around the first side frame member, and a removable pin associated with the lip to retain the position of the first side frame member under the lip, upright legs located adjacent the second side frame member of the frame assembly, said legs having lower extensions extended downwardly below the bottom frame member into the water adjacent the dock to the bottom of the body of water to support the frame assembly and screen attached to the frame assembly on the bottom of the body of water, said legs also having inwardly directed arms providing stops for the door in the open position and handles to facilitate placement and removal of the box into and out of a body of water, and clamps connecting the legs to the second side frame member of the frame assembly and allowing the legs to be vertically adjusted relative to the frame assembly to accommodate the depth of the body of water adjacent the dock.

2. The box of claim 1 wherein: the frame assembly has horizontal and vertical side and end frame members, and connectors joining the horizontal and vertical frame members.

3. The box of claim 2 wherein: the fasteners are loop ties connecting the screen to horizontal and vertical frame members.

4. The box of claim 2 wherein: the horizontal and vertical frame members comprise linear plastic tubes.

5. The box of claim 1 including: generally flat pads connected to the lower extensions of the legs adapted to rest on the bottom of the body of water thereby supporting the frame assembly and mesh screen attached to the frame assembly.

6. The box of claim 1 wherein: said legs comprise a pair of upright legs, each of said legs being located adjacent a second side frame member.

* * * * *